United States Patent
Chou et al.

(10) Patent No.: US 6,810,293 B1
(45) Date of Patent: Oct. 26, 2004

(54) COMPACT INTEGRATED SELF CONTAINED SURVEILLANCE UNIT

(75) Inventors: David C. Chou, Albuquerque, NM (US); Frederick M. Jonas, Albuquerque, NM (US); James W. Staggs, Albuquerque, NM (US)

(73) Assignee: United International Engineering, Inc., Albuquerque, NM (US)

( * ) Notice: Subject to any disclaimer, the term of this patent is extended or adjusted under 35 U.S.C. 154(b) by 134 days.

(21) Appl. No.: 09/915,809

(22) Filed: Jul. 26, 2001

(51) Int. Cl.$^7$ .......................... G06F 17/00; G06K 9/00; G01C 21/26; G01C 21/28
(52) U.S. Cl. .................... 700/90; 342/357.06; 701/213; 382/103
(58) Field of Search ........................... 700/90; 701/207, 701/213, 223, 224, 300; 382/103; 345/7–9; 89/41.01, 41.17, 41.19, 200, 201, 204, 205; 42/111, 130; 342/357.06

(56) References Cited

U.S. PATENT DOCUMENTS

| | | | |
|---|---|---|---|
| 4,570,227 A | * 2/1986 | Tachi et al. ................. 701/202 |
| 4,910,401 A | 3/1990 | Woods ........................ 250/332 |
| 4,949,089 A | * 8/1990 | Ruszkowski, Jr. ............ 342/52 |
| 5,035,472 A | * 7/1991 | Hansen ........................ 359/350 |
| 5,386,308 A | * 1/1995 | Michel et al. ................ 349/11 |
| 5,534,697 A | 7/1996 | Creedmore et al. ......... 250/332 |
| 5,546,092 A | * 8/1996 | Kurokawa et al. ..... 342/357.06 |
| 5,568,152 A | * 10/1996 | Janky et al. ............ 342/357.08 |
| 5,672,820 A | * 9/1997 | Rossi et al. ................ 73/178 R |
| 5,864,481 A | 1/1999 | Gross et al. ................... 700/90 |
| 6,020,994 A | 2/2000 | Cook .......................... 359/365 |
| 6,064,398 A | * 5/2000 | Ellenby et al. ............. 345/633 |
| 6,072,524 A | 6/2000 | Davis et al. ................ 348/164 |
| 6,144,031 A | 11/2000 | Herring et al. ............. 250/352 |
| 6,163,309 A | * 12/2000 | Weinert ......................... 345/7 |
| 6,321,158 B1 | * 11/2001 | DeLorme et al. ........... 701/201 |
| 6,388,611 B1 | * 5/2002 | Dillman .................. 342/357.06 |
| 6,449,892 B1 | * 9/2002 | Jenkins ........................ 42/1.01 |
| 6,456,938 B1 | * 9/2002 | Barnard ....................... 701/213 |
| 6,516,699 B2 | * 2/2003 | Sammut et al. ............. 89/41.17 |
| 2002/0180866 A1 | * 12/2002 | Monroe ....................... 348/153 |
| 2002/0198659 A1 | * 12/2002 | Doyle et al. ................ 701/300 |
| 2003/0069693 A1 | * 4/2003 | Snapp et al. ................ 701/213 |
| 2003/0154262 A1 | * 8/2003 | Kaiser et al. ................ 709/219 |

FOREIGN PATENT DOCUMENTS

JP           2001091268        *  4/2001     .......... G01C/21/00

* cited by examiner

*Primary Examiner*—Albert W. Paladini
*Assistant Examiner*—Ryan Jarrett
(74) *Attorney, Agent, or Firm*—DeWitt M. Morgan

(57) ABSTRACT

An integrated, compact, self contained surveillance unit including: a housing having a front end and a back end; a sensor section attached to the front end of the housing; mechanism for determining the position of the unit; a communications system; a computer, and image output attached to the back end of the housing connected to the computer. The computer is connected to the sensor section, the position determination mechanisms, the communication system and the image output. All are supported by the housing. The sensor is selected from the group including visible sensors, UV sensors, short wavelength infrared sensors and long wavelength infrared sensors. The sensor section also includes an uncooled focal plane array. The position determination mechanisms include GPS, GLONASS, an accelerometer and a compass. The communication system, which is bi-directional, includes a multi-mode patch antenna and a SDR. The computer includes digital signal processing, field programmable gate array and memory (both volatile and non-volatile). The surveillance unit also includes a temperature sensor connected to the computer. The image output is, preferably, a heads up display which is detachable from the housing. Finally, the surveillance unit includes mechanisms for inputting and manipulating data, including a touchpad.

17 Claims, 4 Drawing Sheets

COMPACT INTEGRATED SELF CONTAINED SURVEILLANCE UNIT

FIELD OF THE INVENTION

The invention relates to an integrated, self contained surveillance system. More specifically, this invention relates to a programmable, multi-mode surveillance system which incorporates modular information fusion from multiple sources to perform multiple functions. The system is compact and light weight, making it ideal for man-portable remote operations.

BACKGROUND OF THE INVENTION

U.S. Pat. No. 5,864,481 to M. D. Gross et al. describes an integrated reconfigurable man-portable communication system, adapted particularly for use in military or law enforcement tactical situations. The system includes a computer with mission oriented hardware and software, which provides the focal point for integration of various peripheral components. The reconfigurable man-portable system also includes a ballistic helmet with an integrated audio headset assembly, a weapon mounted thermal weapons site, a remote video system, and a laser rangefinder/digital compass assembly. The helmet itself has a modular heads-up display assembly for providing remote viewing via a helmet mounted laser detection system. The heads-up display assembly and the audio headset assembly provide the user with tactical information such as 360 degree laser detection from helmet mounted detectors, target location for direct and indirect target engagement from the weapon mounted laser rangefinder/digital compass assembly, navigational positioning from a global positioning system, and an individual radio module integrated within a modular load carrying device.

As is evident from the specification and drawings, the system of M. D. Gross et. al. is bulky and cumbersome. The system consists of a number of major subsystems including: (1) a combined computer and radio subsystem which, along with batteries and other equipment, is carried on a specially designed pack frame; (2) weapons systems; (3) a helmet assembly subsystem; and (4) what is termed a "remote input pointing device." The separate weapons subsystems, which are each carried on the weapon (e.g., M16), include a thermal weapons sight, video camera, laser rangefinder/digital compass, and an infrared aiming light. All of these components are separately housed and separately mounted on the weapon. The helmet assembly includes a specially designed (or specially modified) helmet incorporating the heads-up display and the plurality of laser detectors. The foregoing components are interconnected by wiring, some of which is exposed.

U.S. Pat. No. 6,020,994 to L. G. Cook discloses a system and mechanical packaging for what is described as a fully integrated multifunctional multispectral sight assembly. The packaging permits the use of the sight on hand-held, man-portable units. All the subsystems of the sight assembly (a direct view day subsystem, a CCD-based visible TV subsystem, a staring IR night subsystem, an eye safe laser rangefinding subsystem and a display subsystem for viewing the output of the TV or IR subsystem) are aligned and use a single telescope and eye piece in order to decrease the size of the assembly. In addition, each sight assembly subsystem operates in a first and second field of view, preferably in a narrow field of view and a wide field of view.

U.S. Pat. No. 6,144,031 to R. J. Herring et. Al. discloses a video camera system with an uncooled focal plane array and radiation shield.

OBJECTS OF THE INVENTION

It is an object of the present invention to provide a programmable, multi-mode surveillance system.

It is an additional object of the present invention to provide a multi-mode surveillance system which incorporates information fusion from multiple sources to perform multiple functions.

It is an additional object of the present invention to provide such a multi-mode surveillance unit in a tightly integrated package to provide a unit having both low weight and volume.

It is a further object of the present invention to provide a multi-mode surveillance system which can be utilized either remotely or hand carried by its user.

It is yet a further object of the present invention to provide a surveillance system which, because of its compact design and low weight, is especially suitable for man-portable remote locations.

When hand carried by its user, it is yet another object of the present invention to provide the user with a compact, cabled and wearable heads-up display (HUD) to connect the user with the surveillance system's information display.

It is yet a further object of the present invention to provide a surveillance unit which has targeting capabilities and which can be mounted on a weapon such as an M4, M16, or AR15.

It is yet a further object of the present invention to provide a surveillance unit which includes target auto-tracking.

It is yet a further object of the present invention to provide a surveillance unit which includes ballistics computation.

It is still yet a further object of the present invention to provide a compact surveillance unit which incorporates, inter alia, satellite (and airborne) imagery, GPS and/or GLONASS position measurement, rangefinding, ballistics computation, secondary voice communications, and temperature sensing.

It is still another object of the present invention to provide a compact surveillance system which incorporates sensor tracking (e.g., GPS for slow position measurement, an accelerometer for fast time position measurement).

It is yet another object of the present invention to provide a surveillance system which incorporates power management.

It is still yet another object of the present invention to provide a compact surveillance system which incorporates event logging (e.g., message sent, message received, rounds fired, unit turned off, unit turned on, change in position, change in position of an object under surveillance).

It is still yet another object of the present invention to provide a surveillance system which uses off-the-shelf components (e.g., compass, card slots, touch pads, optics, video $\mu$P, programmable memory, etc.).

Other objects, advantages and novel features of the present invention will become apparent from the following detailed description, considered in conjunction with the accompanying drawings.

SUMMARY OF THE INVENTION

An integrated, compact, self contained surveillance unit including: a housing having a front end and a back end; a sensor section attached to the front end of the housing; mechanisms supported by the housing for determining the position of the unit; a communications system supported by the housing; a computer supported by the housing; and image output attached to the back end of the housing connected to the computer. The computer is connected to the sensor section, the position determination mechanisms, the communication system and the image output. The sensor is selected from the group including visible sensors, UV sensors, short wavelength infrared sensors and long wavelength infrared sensors. The long wavelength sensor section also includes an uncooled focal plane array. The position determination mechanisms include GPS, an accelerometer and a compass. The communication system, which is bi-directional, includes a multi-mode patch antenna and a software definable radio (SDR). The computer includes digital signal processing, field programmable gate array and memory (both volatile and non-volatile). The surveillance unit also includes a temperature sensor connected to the computer. The image output is, preferably, a heads up display which is detachable from the housing. Finally, the surveillance unit includes mechanisms for inputting and manipulating data. The information manipulating mechanism includes a touchpad.

DESCRIPTION OF THE PREFERRED EMBODIMENT

Figure 1:
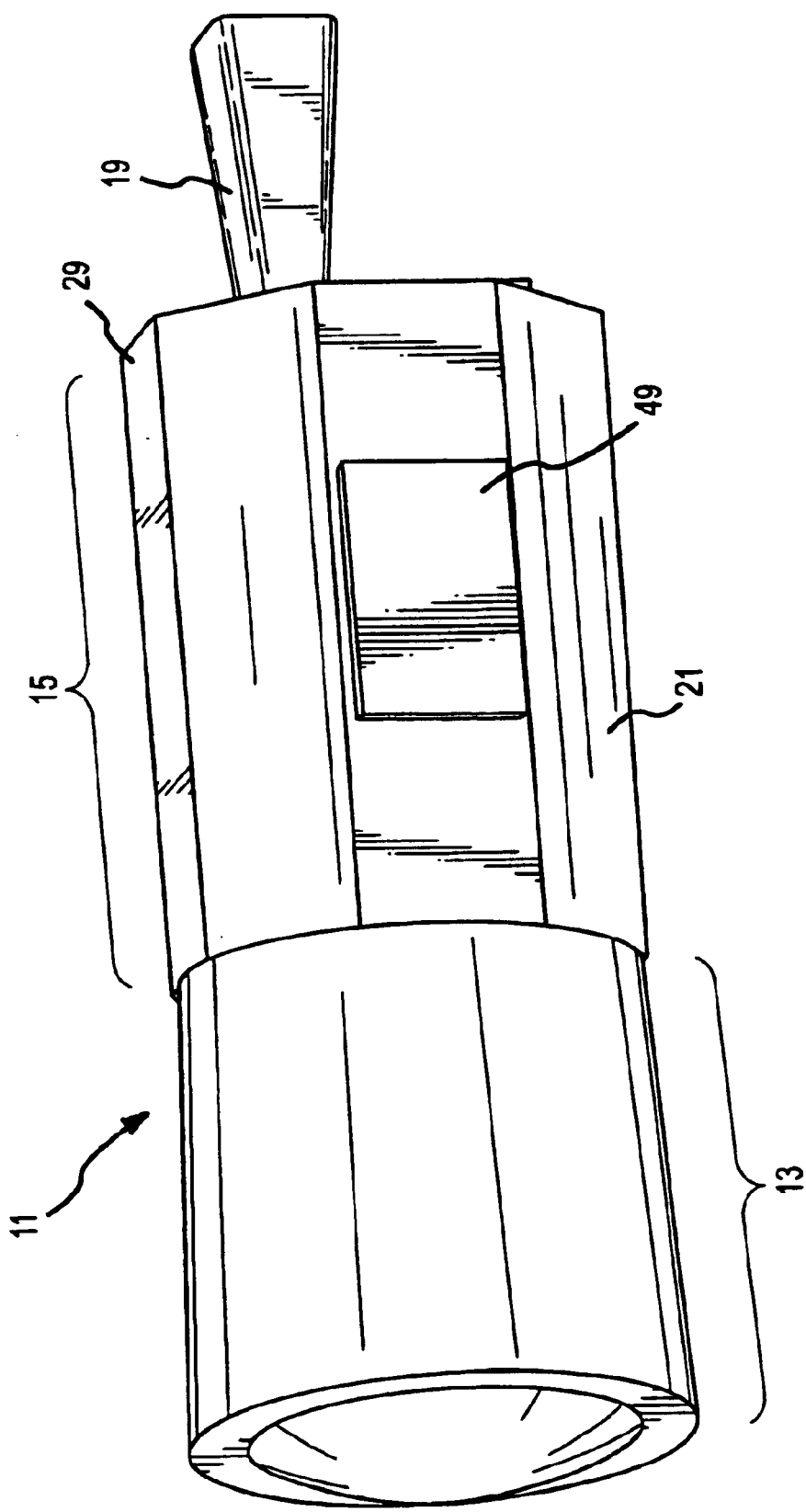
FIG. 1 is a front perspective view of the compact, integrated, self-contained surveillance system of the present invention.
Figure 2:
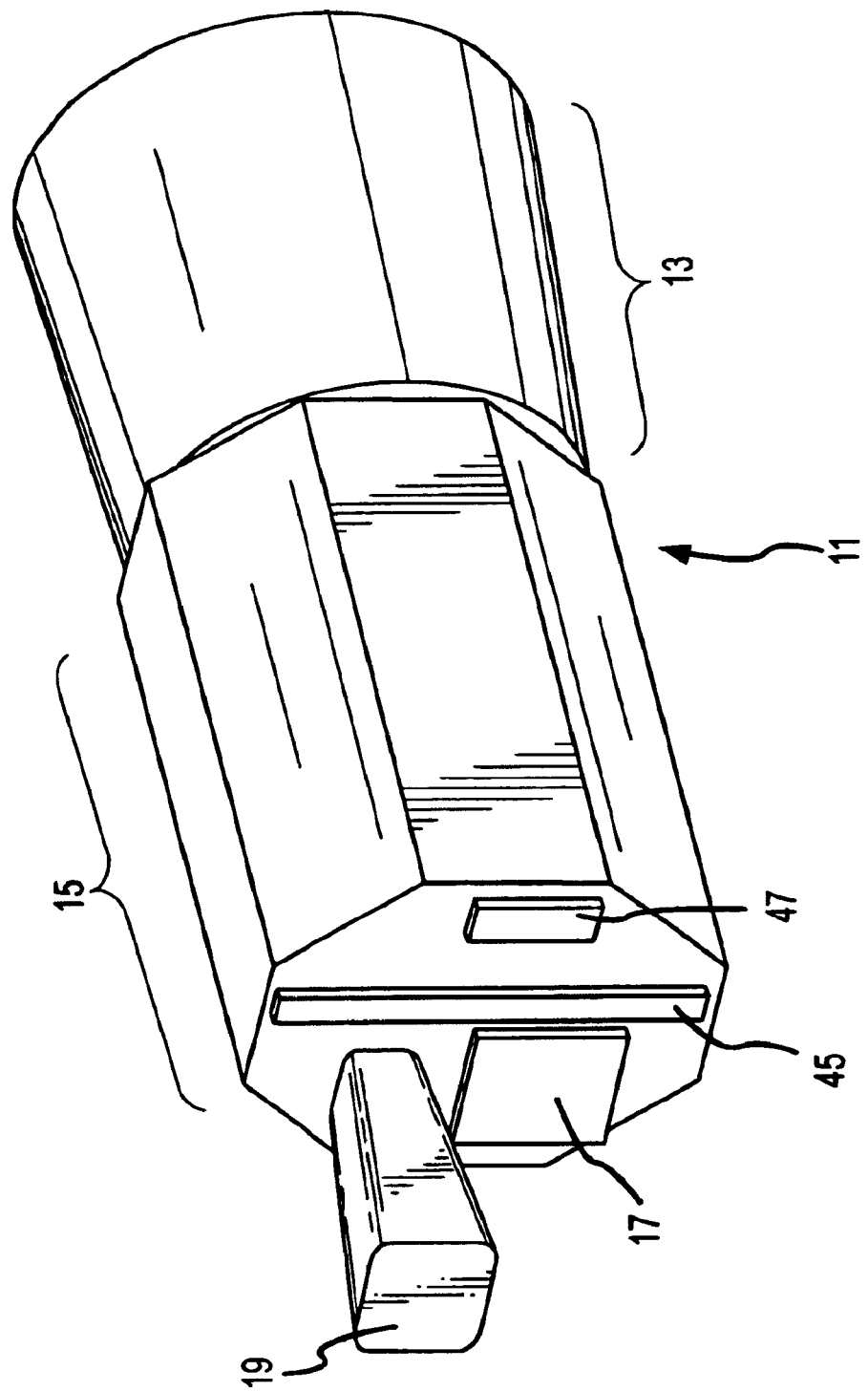
FIG. 2 is a back perspective view of the surveillance system of FIG. 1.
Figure 3:
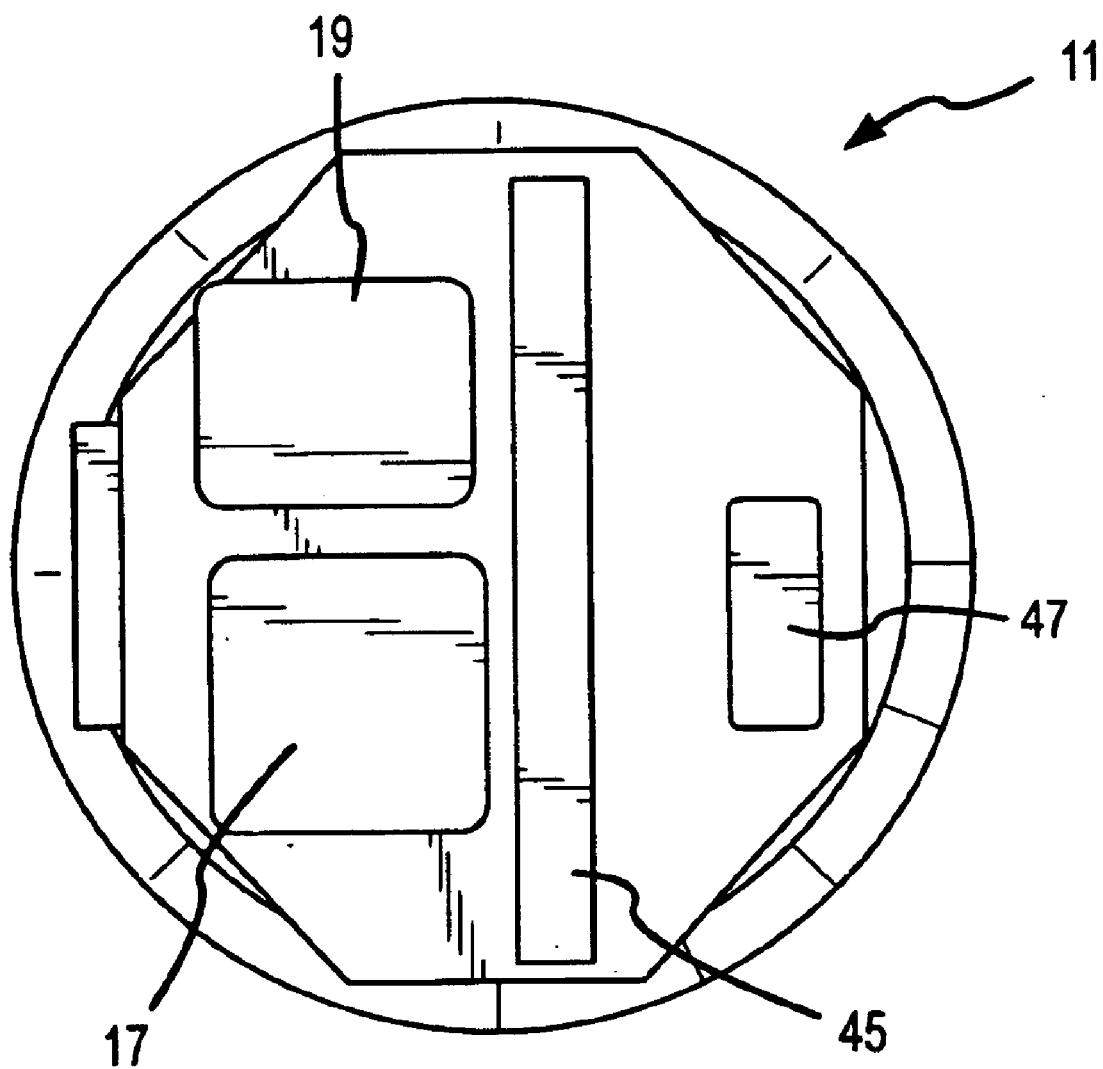
FIG. 3 is a back view.

Surveillance system 11 is divided basically into three sections: (1) optics section 13; (2) electronics and power section 15; and (3) heads up display (sometimes referred to as eyepiece) 19. Electronics and power section 15 are supported by housing 21, which includes a mechanical attachment section (not shown) to secure unit 11 to the mounting rail incorporated on small arms, such as the M16, $M_4$ and AR15.

Housed within optics section 13 are the system's optics 23, such as a long wave infrared sensor (LWIR), uncooled focal plan array 25 and a video $\mu P$ 27. See FIG. 4. Within section 15 are supported battery 17, antenna 29, radio frequency transceiver 31, GPS/GLONASS position measurement unit 33, compass 35, digital signal processor (DSP)/field programmable gate array (FPGA) 37, memory 39 and accelerometer 41. Optionally, section 15 can also include temperature sensor 43. Housing 15 also includes a Type II PC card slot 45, an external USB data port 47, and a touch pad 49.

Figure 4:
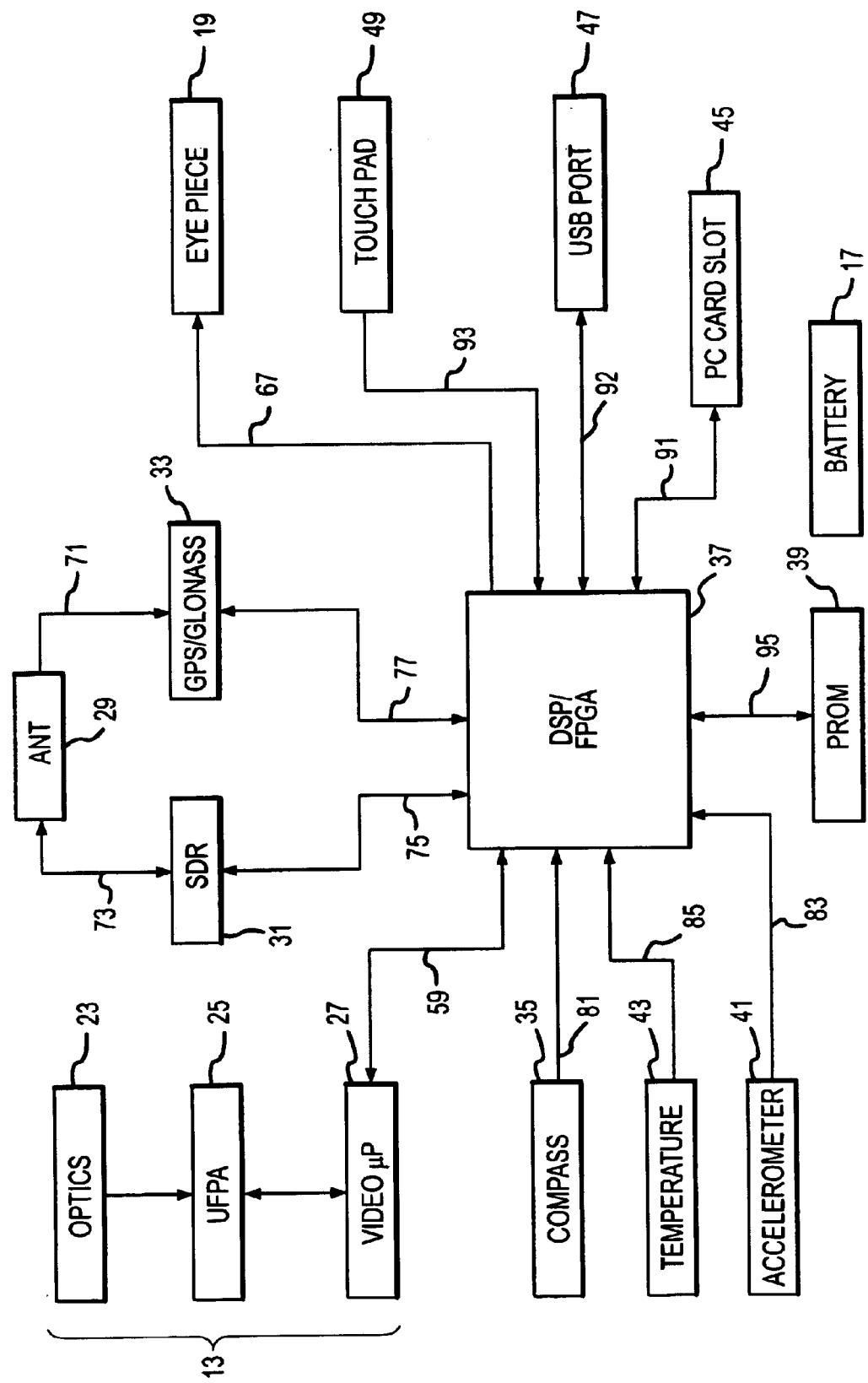
FIG. 4 is a schematic, which illustrates the data flow between the subsystems of the surveillance system and with external systems.

With reference to FIG. 4, optics 23 is coupled to focal plane array 25 (such as an uncooled infrared microbolometer focal plane array manufactured by The Boeing Company). Video $\mu P$ 27 is coupled to the internal electronics of focal plane array 25 to permit the output of data from optics 23.

Connection 59 couples video $\mu P$ 27 with DPS/FPGA 37. Via connection 59 and video $\mu P$ 27, DSP/FPGA 37 sends a control signal to focal plane array 25 to read out specific pixels (included in the focal plane array) for purposes of calibrating focal plane array 25 and the gains and offsets used to correct for focal plane anomalies. (Since the calibration process also includes sensing ambient temperature, focal plane array 25 can also be used as a temperature sensor, thus eliminating the need for temperature sensor 43.) In response to a command from DSP/FPGA 37, internal electronics reads a specific set of pixels and sends the corrected data, including temperature, back to DSP/FPGA 37 via video $\mu P$ 27 and connection 59.

The corrected streaming video from video $\mu P$ 27 is then sent to DSP/FPGA 37, also over connection 59, which in turn sends the corrected streaming video (with or without enhancements, as explained below) to eyepiece 19 over connection 67. Eyepiece 19 is, preferably, a micro optical VGA heads up display which, in operation, can be detached from housing 21 via any conventional, mechanical connector (not shown). Though physically detachable, eyepiece 19 is still, via connection 67, connected to housing 21 and DSP/FPGA 37.

Antenna 29 is, preferably, a conformal patch antenna which sends and receives RF signals. It has either a center frequency and bandwidth or, alternatively, a frequency range (preferably 1.2 to 2.4 GHz). Received RF signals are transmitted to GPS/GLONASS 33 via connection 71. RF signals are also transmitted to radio frequency transceiver 31, via connection 73.

Radio frequency transceiver 31 is a software definable radio (SDR) which can be used as a cell phone, a satellite phone (in either case accelerometer 41, because of its sensitivity, is used as the speaker), a generic receiver (within the frequency range of the antenna 29), and as a generic transmitter (again within the frequency range of antenna 29). Radio frequency transceiver 31 sends the base band information content of the RF signal to DSP/FPGA 37 over connection 75. Signals from DSP/FPGA 37 to radio frequency transceiver 31, to control its configuration and transmit data to a remote location, are also sent over connection 75.

GPS/GLONASS 33 contains two chips which receive the RF signals from antenna 29 and compute location based on the measurement of the time difference between RF signals from many different satellites. They provide parallel, redundant time keeping and user location functions. The NMEA-0183 protocol is used for both. GPS/GLONASS 33 is connected to processor 37 via connection 77 which permits the transmission of signals to GPS/GLONASS 33 (where am I? time, or both) and data back (location, time, both).

Compass 35 is a digital compass which sends a signal to DSP/FPGA 37 via connection 81. Temperature sensor 43 is optional, depending on whether focal plane array 25 is used to measure temperature. When incorporated, it is connected to DSP/FPGA 37 via connection 85

Accelerometer 41 includes three independent micro electro mechanical structures (i.e., MEMS devices) which measure change of motion on three different axes (i.e., x, y and z). Each of the three MEMS devices independently sends, via connection 83, a signal corresponding to a dc voltage to DSP/FPGA 37. Each signal ranges from 0 (which represents the at rest position) to 2 volts (which represents full scale movement). Accelerometer 41 which, in the preferred embodiment is (approximately) 5 mm×5 mm×1 mm, is mounted on the interior side of housing 21.

The processor portion of DSP/FPGA 37 is, preferably, a 16 bit digital signal processor. Such a processor has a number of features which make it desirable in the present invention (e.g., 9 different power management zones and multiple internal busses, which permits data to come in and out independently). Thus, the processor portion is capable of moving large amounts of data and, in parallel, simultaneously processing arrays of information and commands. This permits the real time fusion (i.e., combining) of different data from various inputs (e.g., preloaded information, video μP 27, antenna 29, accelerometer 41, etc.) and commands (as discussed below). The use of a DSP also has the advantage of conserving power, hence battery life is optimized.

The FPGA within the DSP/FPGA combination provides for the programmable and reconfigurable aspects of the functionality of system 11. The FPGA off-loads from the DSP portion certain signal processing and data manipulation functions. It performs all functions significantly faster than can the DSP portion alone. It functions as a digital pre-, and post-, processor for a variety of data types (e.g. navigation, communication), the processing of large volumes of matrixed data (i.e. multiple images), and their filtering. User specific I/O functions (e.g., USB or 1394) can be programmed into the FPGA portion to allow users to integrate to their current system architectures without changing the hardware design.

As previously indicated, housing 21 also supports a battery 17, card slot 45, a touch pad 49, and a USB data port 47. Typically, card slot 45 is a Type II PC card slot which has a generic open spec. Alternately, where RF communications are not required, a 3COM type card slot can be used. For military applications a VDC 400 card slot can be used. Regardless of the type, a variety of pre-programmed data (depending upon the specific application(s) for which system 11 is being used) is input to DSP/FPGA 37 via card slot 45 and connection 91. Touch pad 49, includes course (i.e., finger) and fine (e.g. stylus) manipulation controls. The finger control is used to control the cursor visible in the screen of heads up display 19. The stylus control can be used for inputting data (such as is done with a Palm Pilot) and handwriting recognition. Touch pad 49 is connected to processor 37 via link 93. USB data port 49, which is connected to DSP/FPGA 37 via link 92, is used to provide external command and control to/from other systems (e.g., a laptop computer).

System 11 has three levels of software: applications program(s), an operating system; and a monitor code. The operating system is, for instance, EG Windows CE, VxWorks, which are real time operating systems which facilitate the use of the applications program(s). The monitor code provides core system connectivity with the DSP portion and aligns the operating system with the other components of system 11 (e.g., GPS/GLONASS 33, radio frequency transceiver 31, accelerometer 41, etc.). The applications code(s) runs on top of the operating system to perform the functions set forth herein. Connected to processor 37 via connection 95 is memory 39, which includes non-volatile type (e.g. flash RAM), which is not affected by power, and volatile, which is affected by power. The non-volatile memory contains all monitor code and core applications code. Volatile memory is provided for critical applications parameters.

Finally, supported within housing 21 is power supply 17 which is connected to everything except antenna 29 and temperature sensor 43 (if provided). Typically, power supply 17 is a Li Ion battery.

Via heads up display 19, which is essentially a miniaturized computer screen, an array of data is selectively provided to the user. Inputs, via cable 67, include functional menus, a multi-mode cursor, navigational and positional images, streaming LWIR images, communications interface, passive rangefinding function, and ballistic solution crosshairs. With the foregoing both preprogrammed data and updated data can be viewed. The preprogrammed data can include terrain information, elevation data and 3-D topographical data. It can also include mission tasking information. The updated data, which comes via antenna 29 (from, for instance, satellite or aircraft or another system 11), can include corrections, updates and additions to any and all of the foregoing. These sources of data can be viewed independently, or overlayed, or via split screen, in the screen of heads up display 19 at the discretion of the user via touch pad 47. For instance, the LWIR corrected video stream can be overlayed with GPS information, temperature and crosshairs. As previously mentioned, use of touch pad 47, via one's finger, controls the cursor visible on the screen to select the desired function from the various menus. The floating crosshairs are, in conjunction with accelerometer 41, used for ballistics computations (except for windspeed), automatic target tracking and passive range finding.

In operation, system 11 can be hand carried by an operator and used during daylight and at night. It enhances night vision while providing a host of automatic user location functions. The GPS and/or GLONASS 33 provide the user with global location to within 6 m, while accelerometer 41 and compass 35 combination measures the users change in location and his/her direction. DSP/FPGA 37 can combine these functions and add functionality by comparing two images of the same target taken at different angles, compare the motion of system 11 between images to derive range to a point in the image, and determine its exact location as well. In fixed applications, processor 37 can infer range to a moving object by pattern recognition (e.g. a vehicle passes in front of a light pole or the lines in a parking lot). Once a distance is estimated a velocity and direction can be inferred. A message can be sent to another monitoring location or, say, law enforcement officials, concerning these measurements. In fixed installation GPS/GLONASS 33 would be unnecessary.

Many modifications and variations of the present invention are possible in light of the above teachings. It is therefore to be understood that, within the scope of the appended claims, the invention may be practiced otherwise than as specifically described.

We claim:

1. An integrated compact, self contained surveillance unit, said unit comprising;
    (a) housing means;
    (b) optics means for collecting radiation and generating images, said optics means attached to said housing means;
    (c) means, attached to said housing, for determining the position of said unit;
    (d) means, including a multi-mode patch antenna, attached to said housing means, for sending and receiving communications from said unit;
    (e) computer means attached to said housing means, said computer means connected to said optics means, said position determination means, and said communication means; and
    (f) image output means connected to said housing means and connected to said computer means for receiving images from said computer means.

2. The surveillance unit of claim 1, wherein said optics means includes a sensor selected from the group including visible sensors, UV sensors, short wavelength infrared sensors and long wavelength infrared sensors.

3. The surveillance unit of claim 2, wherein said optics means also includes uncooled focal plane array.

4. The surveillance unit of claim 1, wherein said position determination means includes GPS position determination means.

5. The surveillance unit of claim 4, further means for determining the motion of said unit.

6. The surveillance unit of claim 5, wherein said motion determination means is an accelerometer.

7. The surveillance unit of claim 6, further including means for determining direction.

8. The surveillance unit of claim 7, wherein said GPS position determination means is coupled to said accelerometer, said means for determining direction, said computer means and said communications means.

9. The surveillance unit of claim 4, wherein said position determination means also includes GLONASS position determination means, said GLONASS position determination means coupled to both said computer means and said communication means.

10. The surveillance unit of claim 1, wherein said communication means includes RF communication means.

11. The surveillance unit of claim 1, wherein said computer means includes digital signal processing means, field programmable gate array means, and memory means.

12. The surveillance unit of claim 1, further including temperature sensing means connected to said computer means.

13. The surveillance unit of claim 1, further including power supply means.

14. The surveillance unit of claim 13, wherein said power supply means is a battery.

15. The surveillance unit of claim 1, wherein said image output means up display.

16. The surveillance unit of claim 1, further including means for manipulating data by the user of said surveillance unit.

17. The surveillance unit of claim 16, wherein said data manipulating means is a touchpad.

* * * * *